United States Patent Office 3,446,844
Patented May 27, 1969

3,446,844
TRI($C_8$–$C_{10}$ ALKYL) m- and p-NITROBENZYL QUATERNARY AMMONIUM HALIDES
Lawrence E. Carosino, Woodside Hills, Del., assignor to Hercules Incorporated, Wilmington, Del., a corporation of Delaware
No Drawing. Filed Jan. 3, 1966, Ser. No. 517,990
Int. Cl. C07c 87/68
U.S. Cl. 260—567.6                                       4 Claims

ABSTRACT OF THE DISCLOSURE

Compounds of the formula

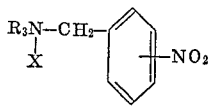

in which X is Cl or Br, the $NO_2$ is in the m- or p-position, and each R group is a normal alkyl group containing 8–10 carbons are useful with a non-ionic dispersing agent therefor a non-phytotoxic water dispersible mildewcide compositions.

---

This invention relates to quaternary ammonium salts and to their use in controlling mildew and particularly powdery mildew on growing plants.

Quaternary ammonium salts are toxic to fungi and to many lower organisms, particularly bacteria and as a result they have found wide utility as disinfectants. Those quaternary ammonium salts which are known to have these desirable toxic properties are normally also toxic to higher forms of plant life. In fact, higher alkyl amines are known to be defoilants for some plants and to be highly toxic to others.

In accordance with the present invention it has now been found that a quaternary ammonium salt of the formula

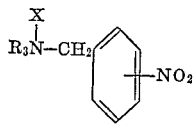

in which X is Cl or Br and the $NO_2$ group is m- or p-, and each R group is an alkyl group having 8–10 is an excellent mildewcide having substantially no phytotoxic activity.

The mildewcide of the present invention is a water insoluble salt having a solubility less than about one part per hundred of water. It is applied to the locus to be protected from mildew in the solid finely divided state, from a colloidal dispersion to a powder. It is preferably applied as a water dispersion using a non-ionic emulsifying agent for the production of a suitable dispersion for spraying. The quaternary amine salt of this invention, being water-insoluble, depends on its being in a finely divided state for its effectiveness. However, it is useful over a wide range of particle size smaller than about 100 mesh and preferably smaller than about 400 mesh. There is no critical lower limit of particle size.

A suitable dispersible composition is essentially the quaternary amine salt admixed with 1–50% of a non-ionic wetting agent. In addition, the dispersible composition may contain an equally finely divided solid inert carrier having particle size less than about 100 mesh such as a clay and this composition will be classed as a wettable powder and will be compounded as is well known in the pesticide art by suitable mixing of the components to form a uniform mixture.

The quaternary ammonium salts which are useful in this invention have peak mildewcide activity when the R groups are alkyls having 8–10 carbons per alkyl chain. Moreover, the phytotoxicity to squash approaches zero when R=$C_8$ and continues at zero phytoxicity as the chain length of the R group is increased to 10 or even higher beyond the scope of this invention.

The activity of the compounds of the invention is shown by the following examples.

Example 1

Tri-n-hexylamine, tri-n-octylamine, tri-n-nonylamine, tri-n-decylamine, and tri-n-dodecylamine were individually reacted with p-nitrobenzyl bromide by mixing 0.1 mole of the amine with 0.1 mole of p-nitrobenzyl bromide in 200 ml. acetonitrile (anhydrous) and refluxing at about 80° C. for 48 hours. The product of this reaction was the quaternary ammonium bromide which was recovered as a viscous syrup by distilling off the excess acetonitrile in vacuo. The quaternary ammonium bromide was soluble in benzene and insoluble in water.

Each of the quaternary amine salts was obtained in quantitative yield and was free of acetonitrile.

A composition of each of the quaternary ammonium salts was made by mixing .05 g. of the quaternary ammonium salt with 0.02 g. Tween-20 (sorbitol monolaurate polyoxyethylene derivative—a non-ionic surface active agent) and adding about 5 ml. acetone to fluidify. This composition was used for producing aqueous dispersions of 0.05% concentration in distilled (based on quaternary ammonium salt) water by mixing a portion of the dispersible composition with the proper amount of distilled water with rapid stirring.

Tests of the aqueous dispersions were made on squash plants. The squash plants (Boston Marrow variety) were grown in 3-inch plastic pots and were used as seedlings with cotyledons well developed and flattened. These were sprayed to run off, and allowed to dry. This left a coating of particles of quaternary ammonium salt on the surface. The leaves were then dusted with spores of *Erysiphe cichoracearum* obtained from leaves of infected squash plants. Control plants were similarly dusted with spores and all plants were held in the greenhouse under moist growing conditions until a good growth of mildew appeared on leaves of the controls. After 10 to 20 days the plants were then examined, and a count made of the number of mildew colonies which had developed. Three replicates were used in each test. The disease index is calculated by dividing the number of mildew colonies on the treated plants by the number of mildew colonies on the control multiplied by 100. At the same time the percent injury on cotyledons due to the quaternary ammonium salt was observed and recorded.

The results of these tests were as follows:

| Test | R | Disease index 0.05% | Disease index 0.025% | Injury, percent 0.05 | Injury, percent 0.025 |
|---|---|---|---|---|---|
| A | n-$C_6$ | 22 | 24 | 4 | 3 |
| B | n-$C_7$ | 20 | 28 | 1 | 1 |
| C | n-$C_8$ | 4 | 5 | 3 | 0 |
| D | n-$C_9$ | 0.2 | 7 | 0 | 0 |
| E | n-$C_{10}$ | 6 | 18 | 0 | 0 |
| F | n-$C_{12}$ | 22 | 30 | 0 | 0 |

These results show that the salts which provide the lowest Disease Index are those in which R lies in the $C_8$–$C_{10}$ range and that those which have R groups larger than $C_8$ can be used without injury. While the $C_8$ compound showed injury at 0.05% concentration, it was substantially equally effective in controlling disease, with no injury at 0.025% concentration.

Example 2

Tricaprylylamine was obtained from the General Mills Company (under the name Alamine 336) and was described in their technical bulletin as a mixture of tertiary amines in which the R groups were n-$C_8$ and n-$C_{10}$ with n-$C_8$ predominating. Vapor phase chromatographic analysis of the material was in agreement with this description. The neutralization equivalent of the sample used in the preparations described herein was 413. The quaternary ammonium salt of this amine was prepared by mixing 0.1 mole of this tertiary amine with 0.1 mole of p-nitrobenzyl chloride and 0.5 g. sodium iodide in 200 ml. ethanol and refluxing at 75–80° C. for 48 hours. The ethanol was distilled off on a bath at 90–95° C. and the last of the ethanol was removed at about 100–110° C. in vacuo (0.2 mm.). The tricaprylyl-p-nitrobenzyl-ammonium chloride thus produced was a viscous syrup.

*Analysis.*—Cl. 5.6%; N, 4.34% (Dumas). Theoretical value: Cl, 6.06%; N, 4.78%.

A concentrate of equal parts of tricaprylyl-p-nitrobenzyl ammonium chloride and Tween-20 prepared as in Example 1 and a minor amount of acetone sufficient to form a clear homogenous solution was dispersed in water to form milky dispersions of concentration from 0.1% to 0.0125% and these were evaluated against squash plants as in Example 1. The results are tabulated below.

TRICAPRYLYL-P-NITROBENZYLAMMONIUM CHLORIDE DISPERSIONS

| Dispersion | Concentration, Percent | Disease index | Injury, Percent |
|---|---|---|---|
| A | 0.1 | 0.1 | 5 |
| B | 0.05 | 0 | 2 |
| C | 0.025 | 0 | 0 |
| D | 0.0125 | 0.6 | 0 |

The preferred compounds of this invention are those in which X is chlorine. The reaction of p-nitrobenzyl chloride with the tertiary amine being slower than is that of p-nitrobenzyl bromide requires a higher reaction temperature or a longer reaction time for completion. The chloride salts being lower in molecular weight are also more effective and cheaper to use.

While the tests show that those quaternary ammonium salts in which the R groups are in the range of $C_8$ to $C_{10}$ are effective when the R groups are the same, related studies indicate that the R groups may be different and that the total carbon in the three R groups in the range of $C_8$ to $C_{10}$ is about 27 at the point of peak effectiveness. The m- and p-nitro compounds are equivalent.

The concentrates of this invention aer clear compatible compositions of the quaternary ammonium salt and an effective amount of a non-ionic dispersing agent. The nonionic dispersing agent is one in which the quaternary ammonium salt is in solution with or without the aid of an organic solvent. Non-ionic dispersing agents which are useful are: octyl or nonylphenol ethylene oxide adducts, e.g., AF–100, Triton X–100, X–114, polyethylene oxide condensates of vegetable oils, e.g., Emulphor EL 620, long chain alkanol phosphates, e.g., Emcol AG–24–96, polyethylene oxide adducts of sorbitan-mono fatty acid condensates, e.g., Tween-20. The amount of non-ionic dispersing agent used in the concentrate is that amount which will produce a useful aqueous dispersion from the concentrate.

When a solvent is desired in the composition, the solvents may be one or more of the following: acetone, lower alcohols ($C_1$–$C_5$), xylene, isophorone, cyclohexanone, methylated naphthalenes, glycols such as ethylene glycol, ether alcohols such as ethyl Cellosolve or ethyl Carbitol, and glycol ethers such as diethylene glycol dimethyl or diethyl ether. The amount of solvent, when used, is in the range of 1% to 90% of the composition.

The concentrate may also be used as a wettable powder which is essentially a concentrate of the quaternary ammonium salt and a non-ionic dispersing or wetting agent diluted with a solid, water-insoluble, finely divided carrier such as any of the various clays, commonly used in wettable powders used in the insecticide art. The amount of carrier will generally be about 25 to 90% of the total composition of the concentrate.

The compositions of this invention are used as aqueous dispersions or as dusts. Aqueous dispersions are more readily controlled and will be those in which the compound of this invention is in the range of 0.15% to 0.025% of the aqueous dispersion depending on the crop being treated.

The compositions of this invention are used in combatting powdery mildew on all kinds of crops including squash, pumpkin, apples, melons, beans, ornamentals and grapes. It is particularly effective on apples and does not cause damage to the fruit when used in the range of dilution set forth above.

What I claim and desire to protect by Letters Patent is:
1. A compound of the formula

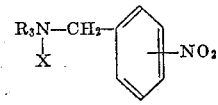

in which X is Cl or Br, the $NO_2$ is in the m- or p-position, and each R group is a normal alkyl group having 8–10 carbons.

2. A compound of claim 1 in which the $NO_2$ group is in the p-position.
3. A compound of claim 1 in which X is Cl.
4. A compound of claim 2 in which X is Cl.

References Cited

UNITED STATES PATENTS 2,519,924   8/1950   Nowak.

FOREIGN PATENTS 586,647   11/1959   Canada.

CHARLES B. PARKER, *Primary Examiner.*

S. T. LAWRENCE III, *Assistant Examiner.*

U.S. Cl. X.R.

71—70; 260—999

UNITED STATES PATENT OFFICE
CERTIFICATE OF CORRECTION

Patent No. 3,446,844   Dated May 27, 1969

Inventor(s)   Lawrence E. Carosino

It is certified that error appears in the above-identified patent and that said Letters Patent are hereby corrected as shown below:

Column 2, line 10, "Tri-n-hexylamine, tri-n-octylamine," should read -- Tri-n-hexylamine, tri-n-heptylamine, tri-n-octylamine, --.

Signed and sealed this 17th day of August 1971.

(SEAL)
Attest:

EDWARD M. FLETCHER, JR.   WILLIAM E. SCHUYLER, JR.
Attesting Officer   Commissioner of Patents